(12) United States Patent
Skolozdra et al.

(10) Patent No.: US 10,185,106 B2
(45) Date of Patent: Jan. 22, 2019

(54) FIBER OPTIC CABLE EXTERNAL SHIELD CONNECTOR

(71) Applicant: Electric Motion Company, Inc., Winsted, CT (US)

(72) Inventors: Stephen A. Skolozdra, Terryville, CT (US); John K. Carrozzo, Torrington, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 15/916,764

(22) Filed: Mar. 9, 2018

(65) Prior Publication Data

US 2018/0259734 A1   Sep. 13, 2018

Related U.S. Application Data

(60) Provisional application No. 62/469,152, filed on Mar. 9, 2017.

(51) Int. Cl.
*G02B 6/44*   (2006.01)

(52) U.S. Cl.
CPC ......... *G02B 6/4429* (2013.01); *G02B 6/4471* (2013.01)

(58) Field of Classification Search
CPC .... G02B 6/4446; G02B 6/4447; G02B 6/445; G02B 6/4439; G02B 6/4471; G02B 6/4477; G02B 6/4486; G02B 6/4488; G02B 6/4429; G02B 6/4435

See application file for complete search history.

(56) References Cited

U.S. PATENT DOCUMENTS

| | | | |
|---|---|---|---|
| 6,011,218 A * | 1/2000 | Burek | G02B 6/4419 174/135 |
| 6,591,055 B1 * | 7/2003 | Eslambolchi | G02B 6/2558 385/136 |
| 9,557,509 B2 | 1/2017 | Skolozdra et al. | |
| 2012/0288250 A1 * | 11/2012 | Balfour | H01R 11/20 385/136 |

* cited by examiner

*Primary Examiner* — John Bedtelyon
(74) *Attorney, Agent, or Firm* — Alix, Yale & Ristas, LLP

(57) ABSTRACT

A fiber optic cable external shield connector grounds a fiber optic cable having both a corrugated conductive shield and a strength member without removal of the outer protective layer of the fiber optic cable. The connector has a grounding cover and a cooperative grounding base each with an electrically conductive grounding assembly having an array of prongs. Bosses of the cover and bosses of the base are fastened together to force the prongs of the conductive assembly to pierce the outer non-conductive sheath of the fiber optic cable. The prongs cooperatively pinch the strength member to ultimately connect the corrugated shield and strength member to an outside ground.

10 Claims, 5 Drawing Sheets

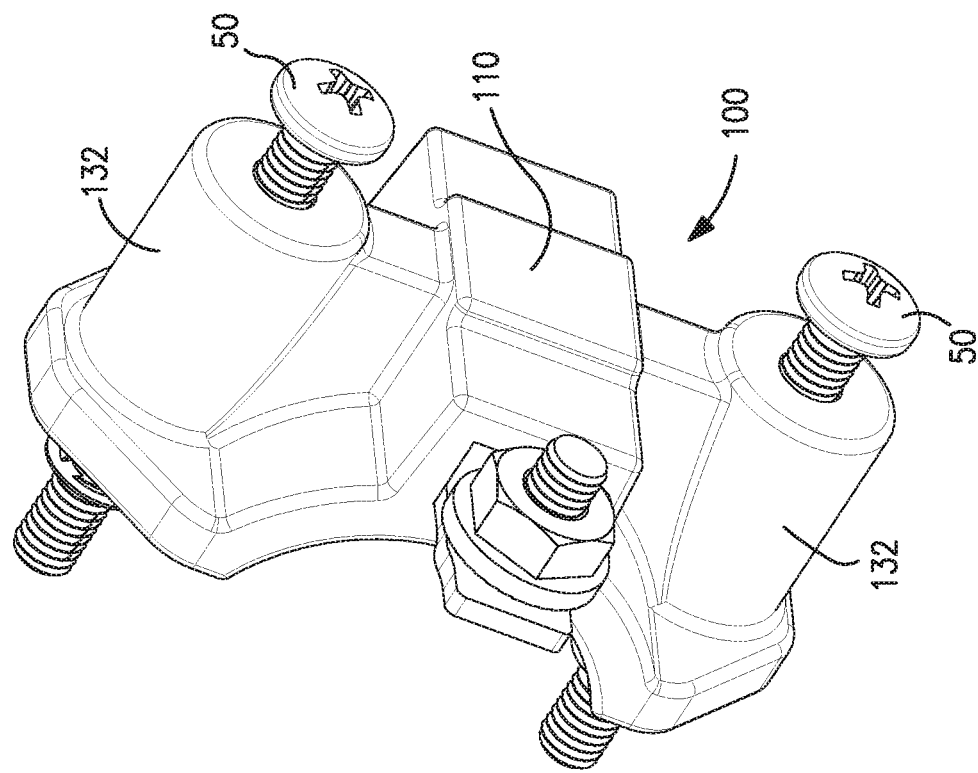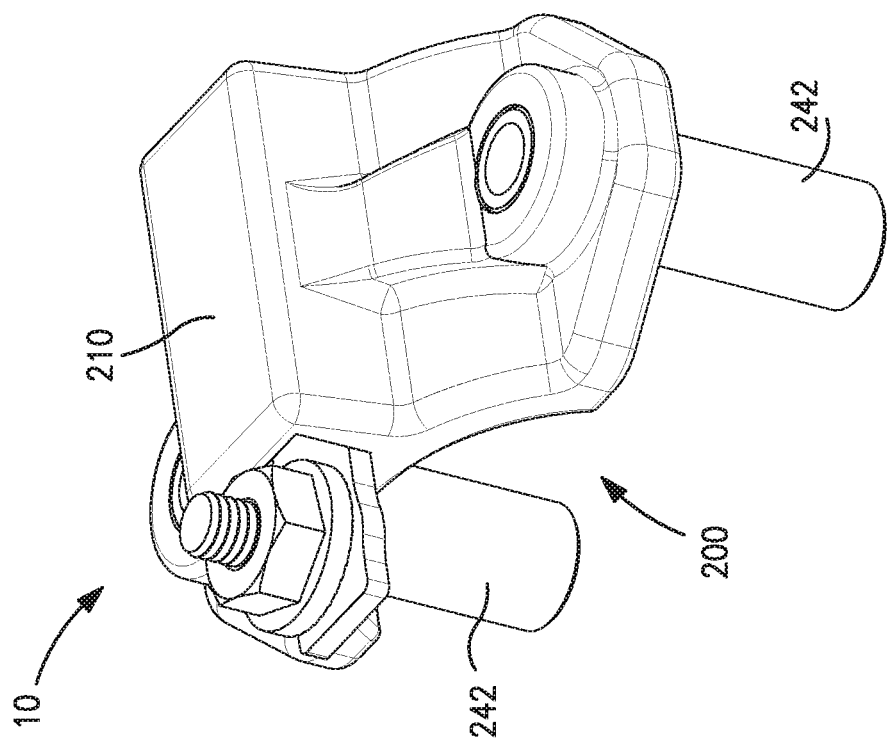
FIG. 1

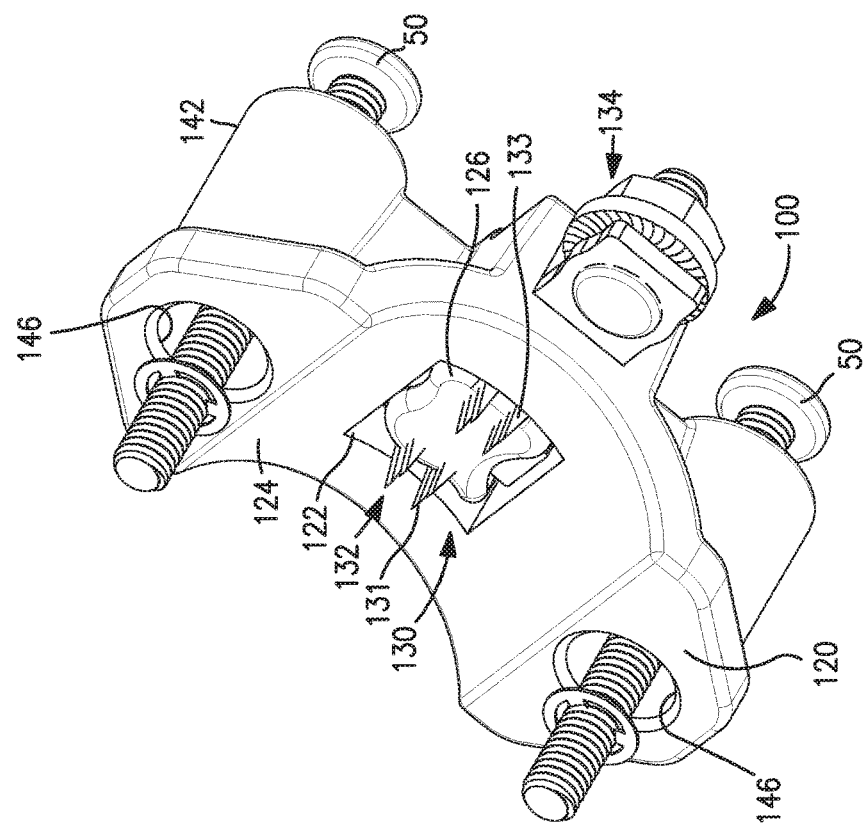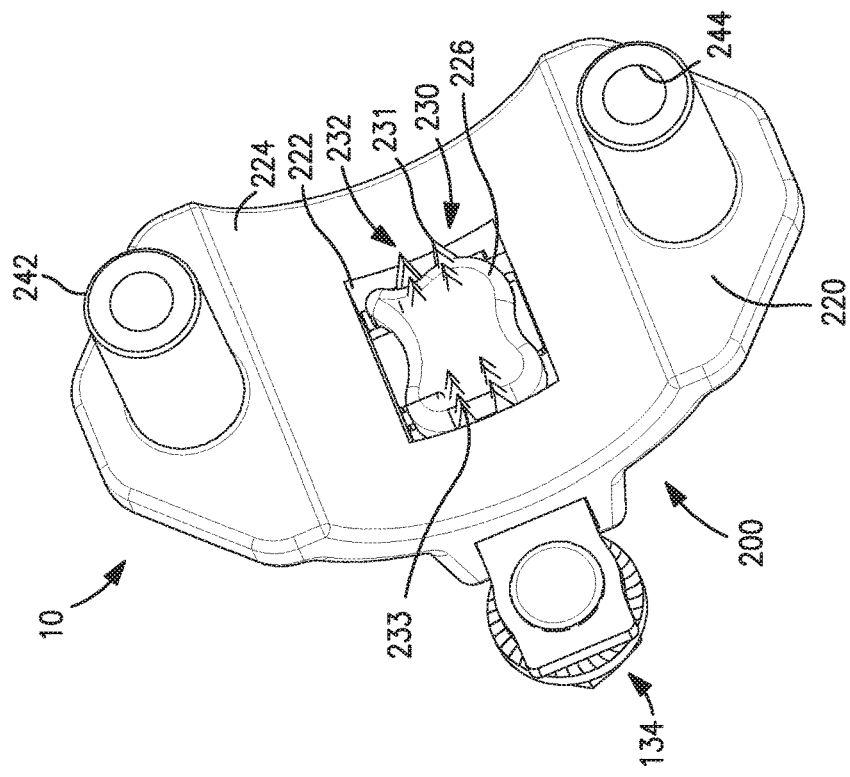
FIG. 2

FIBER OPTIC CABLE EXTERNAL SHIELD CONNECTOR

BACKGROUND

This disclosure relates generally to an external shield connector used to connect fiber optic cables to an outside ground.

A cable that utilizes conductive materials is required to be grounded to ensure the safety of individuals in the presence of the cable, to protect the cable and components attached thereto from damage and to increase the overall performance of the cable. To do so, the cable is connected to an outside ground at prescribed distances.

Fiber optic cables may have an outer nonconductive sheath that protects an interior portion from outside elements such as moisture. The interior portion of the fiber optic cable may include optical fibers, an inner conductive shield and a strength member. To ground the fiber optic cable, the outer nonconductive sheath may be stripped using specific tools to create an opening to the interior portion of the fiber optic cable so that the inner conductive shield and strength member can be connected to an outside ground.

However, connectors and grounding techniques which penetrate the outer nonconductive sheath of fiber optic cables and conductively connect the inner conductive shield and the strength member to an outside ground without stripping the outer nonconductive sheath would be welcome in the art.

SUMMARY

The disclosed fiber optic cable external shield connector is a device capable of grounding fiber optic cables that include both a corrugated conductive shield and a strength member, without having to remove an outer protective layer of the fiber optic cable. The external shield connector incorporates components selected and assembled to enable the external shield to connect both the conductive shield and strength member to an outside ground, without exposing the internal portion of the fiber optic cable to external elements.

A fiber optic cable shield connector comprises a grounding cover and a cooperative grounding base, each having a pair of complementary laterally opposed fastener-receiving bosses and an electrically conductive grounding assembly. Each conductive assembly includes an array of prongs which ultimately conductively communicates with the external ground. The cover and the base are positioned at opposing sides of the fiber optic cable and aligned such that the bosses of the cover align with the bosses of the base. The bosses of the cover and the bosses of the base are fastened together to force the prongs of the conductive assembly to pierce the outer nonconductive sheath of the fiber optic cable. The prongs of the conductive assembly contact the corrugated shield and cooperatively pinch the strength member to ultimately connect the corrugated shield and the strength member to the outside ground.

BRIEF DESCRIPTION OF THE DRAWINGS

FIG. 1 is a generally top perspective view of one disclosed embodiment of the fiber optic cable external shield connector in a disassembled form;

FIG. 2 is a generally bottom perspective view of the disclosed embodiment of FIG. 1 in a disassembled form;

DETAILED DESCRIPTION

Figure 3:
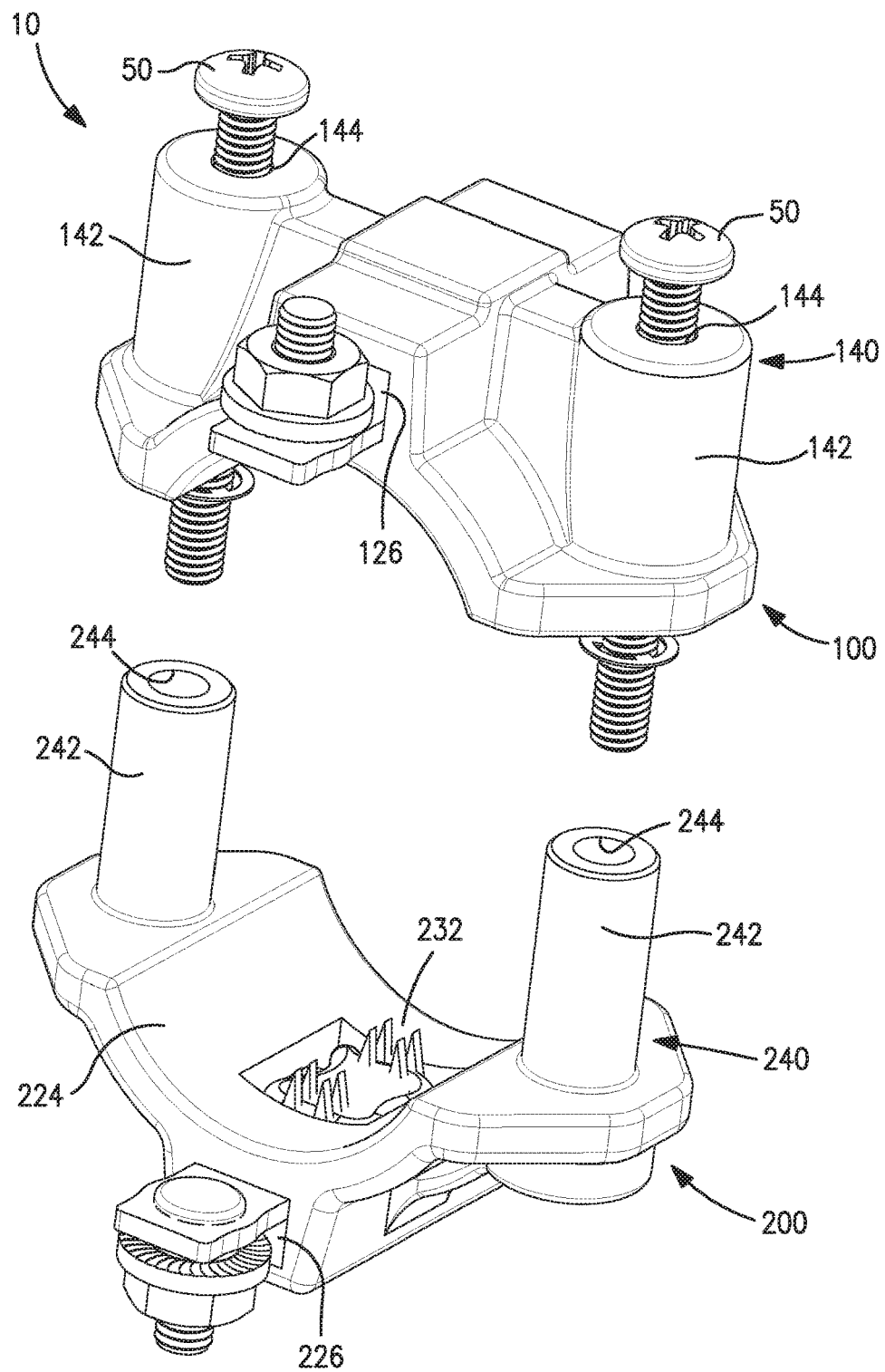
FIG. 3 is a side perspective view of the disclosed embodiment of FIG. 1 illustrating a pre-assembled step.

An embodiment of a fiber optic cable external shield connector (hereinafter "external shield connector") according to aspects of the disclosure will now be described with reference to FIGS. 1-5, wherein like numerals represent like parts, and will generally be referred to by the reference numeral 10. The external shield connector 10 is contemplated for use in grounding a fiber optic cable 300. The connector 10 may, for example, be adapted for cables having a diameter of 0.80 to 1.30 inches and which also employ strength members adjacent opposed sides. The connector 10 can also be employed for grounding fiber optic cables without strength members. Numerous connectors 10 can be installed and connected to ground for a given cable. Various materials, methods of construction and methods of fastening will be discussed in the context of the disclosed embodiment.

Figure 5:
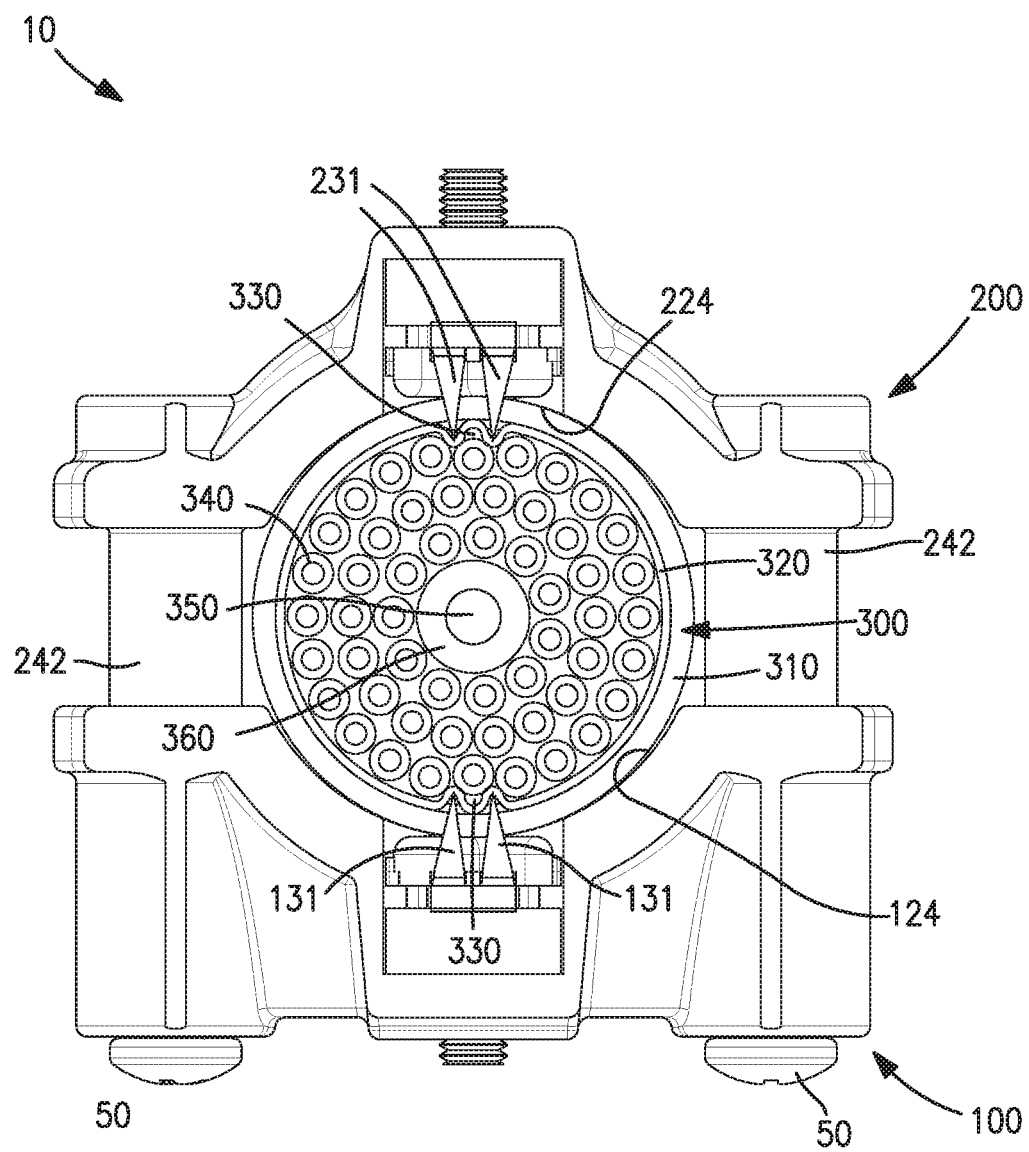
FIG. 5 is a quasi-sectional view of the installation of FIG. 4 taken along the line 5-5 thereof.

As shown in FIG. 5, a representative fiber optic cable 300 includes a plurality of optical fibers 340 surrounding a center support wire 350. In the disclosed embodiment, the center support wire 350 is made of a nonconductive rigid center such as KEVLAR® or other compatible materials and is surrounded by an inner nonconductive sheath 360. The inner nonconductive sheath 360 is surrounded by the optical fibers 340. A corrugated conductive sheath 320 surrounds the optical fibers 340. A conductive strength member 330 extends longitudinally between the corrugated conductive sheath 320 and the optical fibers 340 at opposing positions of the fiber optic cable 300. The strength member 330 may be comprised of copper wire but other materials are compatible with the fiber optic cable 300. An outer nonconductive sheath 310 surrounds the corrugated conductive sheath 320.

As shown in FIGS. 1-3, the external shield connector 10 comprises a grounding cover 100 and a cooperative grounding base 200. The cover 100 and base 200 are shell-like members which clamp together around the cable 300 to provide the grounding connection. The designation of components as a "cover" or a "base" is arbitrary. The cover 100 and base 200 have similar or corresponding structures, as will be described below. For ease in description, the features and structures of cover 100 are designated with a three digit numeral having a lead digit of 1, and the features and structures of base 200 are designated with a three digit numeral having a lead digit of 2. In the disclosed embodiment the cover 100 and the base 200 are constructed of dielectric plastic, but other nonconductive materials are compatible with the external shield connector 10.

The cover 100 and the base 200 each have outer surfaces 110, 210 and spaced inner surfaces 120, 220. The inner surfaces 120, 220 engage opposing exterior portions of the cable sheath 310. An arcuate recess 124, 224 extends longitudinally across the inner surfaces 120, 220. A central cradle 122, 222 extends inwardly away from the inner surfaces 120, 220 to form a pair of alignable receiving cavities. Grounding slots 126, 226 are respectively disposed between the outer surfaces 110, 210 and inner surfaces 120, 220 and extend longitudinally from each cradle 122, 222 to an outer longitudinal end of the respective cover 100 and the base 200.

The cover 100 and the base 200 each respectively mount an electrically conductive grounding assembly 130, 230 comprising an array of prongs 132, 232 communicating with a stud assembly 134, 234. Each array of prongs 132, 232 includes a first set of two pairs of laterally spaced prongs 131, 231 longitudinally offset from a second set of two pairs of laterally spaced prongs 133, 233. Each array of prongs 132, 232 is mounted in a respective cradle 122, 222. The prongs respectively project away from the outer surfaces 110, 210 beyond the inner surfaces 120, 220 and protrude into the respective arcuate recesses 124, 224 of the cover 100 and the base 200. The distal prong protruding distances are preferably fixed at a pre-established distance slightly greater than or equal to the radial thickness of the sheath 310 and the shield 320.

A rubber pad 126, 226 is disposed in each cradle 122, 222 between each conductive assembly 130, 230 and the principal body portions of the cover 100 and the base 200. Each stud assembly 134, 234 extends through a respective grounding slot 126, 226 and conductively communicates with a corresponding array of prongs 132, 232 of the cover 100 and the base 200. This configuration provides a grounding path from each array of prongs 132, 232 to each stud assembly 134, 234 to an external ground 400 (schematically designated).

The cover 100 includes a pair of laterally opposed fastener-receiving bosses 142 extending from the inner surface 110 to the outer surface 210. Each boss 142 is substantially cylindrical with an axial bore extending from an outer opening 144 to opening 146 at the inner surface. A screw 50 is inserted through opening 144 and extends through the bore of the cover 100. Each boss 142 of the cover 100 is positioned adjacent a lateral end of the cover 100.

The base 200 includes a pair of laterally opposed fastener-receiving bosses 242 complementary to and alignable with the bosses 142 of the cover 100 (See FIG. 3). The bosses 242 are generally cylindrical with a reduced diameter and have a threaded bore 244. The bosses 242 of the base 200 project from the inner surface 220 away from the outer surface 210. Each boss 242 of the base 200 is positioned adjacent a lateral end of the base 200 and is alignable with and slidably receivable in the axial bore. Each screw 50 is threadably engageable in the threaded bore 244 to clamp the cover to the base.

Figure 4:
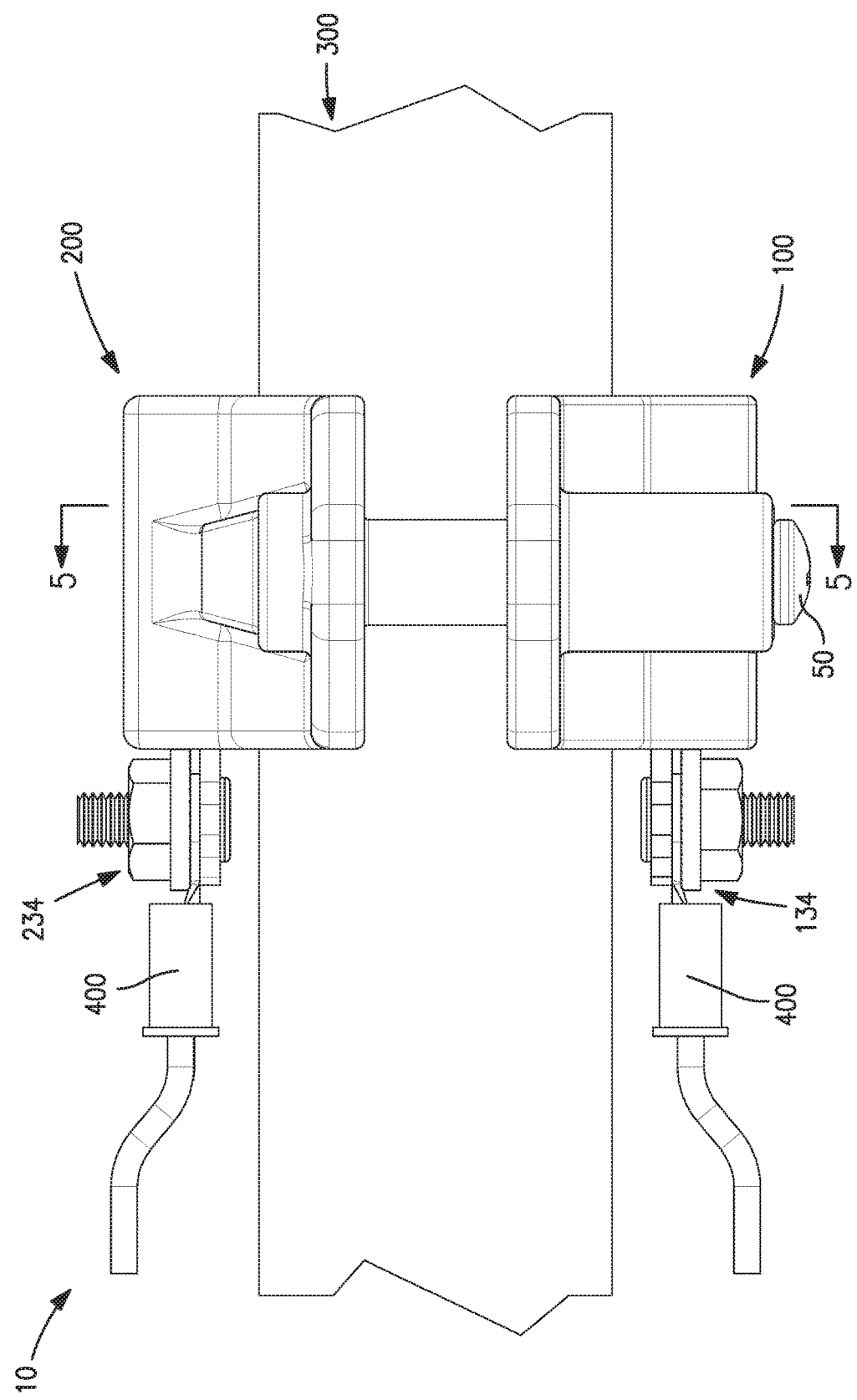
FIG. 4 is a side view of the disclosed embodiment of FIG. 1 installed on a fiber optic cable.

As shown in FIGS. 3-5, the external shield connector 10 is installed on the fiber optic cable 300 by positioning the cover 100 and the base 200 at opposing sides of the fiber optic cable 300 with the strength members 330 positioned between laterally spaced prong pairs 131, 231. The inner surface 120 of the cover 100 faces the inner surface 220 of the base 200. The bosses 142 of the cover 100 align with the bosses 242 of the base 200 and the ends of bosses 242 are slidably received in the openings 146 of bosses 142. A pair of screws 50, or other compatible fastener, passes through the bosses 142 of the cover 100 to threadably engage the bosses 242 of the base 200 to thereby fasten the cover 100 to the base 200 and clamp together the cover and the base against the intermediately positioned fiber optic cable 300.

As shown in FIG. 5, upon sufficiently torqueing the screws 50, each array of prongs 132, 232 pierces through the outer nonconductive sheath 310 and contacts the corrugated conductive sheath 320. The prong pairs 131, 133, 231, 233 capture and pinch each strength member 330 on opposing sides of the fiber optic cable 300 (only prongs 131 and 231 are visible). The piercing of the outer nonconductive sheath 310 is protected from outside elements by the engagement of the external shield connector 10 and the fiber optic cable 300 which is limited by the arcuate surfaces of the recesses 124, 224 and the fixed projection distances of the prong. The fiber optic cable 300/connector 10 interface acts as a seal between the prong produced piercings and outside elements. In one embodiment, a hydrophobic gel is administered to each array of prongs 132, 232 to further protect against permeation by outside elements such as moisture.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. An optical wire grounding assembly comprising:
   an optical cable having a corrugated conductive shield surrounding an opposed pair of strength members and surrounded by an outer nonconductive sheath;
   a grounding base having a first surface and a second surface, a pair of laterally opposed fastener-receiving bosses, a central cradle extending inwardly from the second surface, a grounding slot situated between the first and second surface extending from the cradle to an outer longitudinal end of the base;
   a grounding cover having a first surface and a second surface, a pair of laterally opposed fastener-receiving bosses, a cradle extending inwardly from the second surface, a grounding slot situated between the first and second surface extending longitudinally from the cradle to an outer longitudinal end of the cover;
   an electrically conductive grounding assembly mounted in each cradle of the cover and the base and extending through the grounding slots of the cover and the base, each conductive assembly comprising a plurality of prongs extending away from the first surfaces beyond the second surfaces of the cover and the base, and a stud assembly conductively communicating with the prongs and extending through the grounding slots of the cover and the base to connect with an external ground,
   wherein the cover and the base are positioned at opposing sides of the cable and the bosses of the cover are fastened to the bosses of the base so that the prongs pierce the outer nonconductive sheath and contact the corrugated conductive shield and cooperatively pinch the strength members.

2. The optical wire grounding assembly of claim 1, wherein the second surface of the cover faces the second surface of the base, the bosses of the cover align with and receive the bosses of the base, and a pair of fasteners passes through the bosses of the cover to the bosses of the base thereby fastening the cover to the base.

3. The optical wire grounding assembly of claim 1, wherein the cradles of the cover and the base are situated in an arcuate recess extending longitudinally across the second surfaces of the cover and the base.

4. An external shield connector comprising:
   a grounding base having a first surface and a second surface, a pair of laterally opposed fastener-receiving bosses, a cradle extending inwardly from the second surface, a grounding slot situated between the first and second surface extending from the cradle to an outer longitudinal end of the base;
   a grounding cover having a first surface and a second surface, a pair of laterally opposed fastener-receiving bosses, a cradle extending from the second surface, a grounding slot situated between the first and second surface extending longitudinally from the cradle to an outer longitudinal end of the cover;

an electrically conductive grounding assembly mounted in each cradle of the cover and the base and extending through the grounding slots of the cover and the base, each conductive assembly comprising a plurality of prongs extending away from the first surfaces beyond the second surfaces of the cover and the base and a stud assembly conductively communicating with the prongs and extending through the grounding slots of the cover and the base;

wherein the second surface of the cover faces the second surface of the base, the bosses of the cover align with the bosses of the base and a pair of screws passes through the bosses of the cover and threads to the bosses of the base thereby fastening the cover to the base.

5. The external shield connector of claim 4, wherein the prongs comprise a first set of two pairs of laterally spaced prongs longitudinally offset from a second set of two pairs of laterally spaced prongs.

6. The external shield connector of claim 4, wherein a rubber pad is disposed between the conductive assembly and a body portion of the cover and the conductive assembly and a body portion of the base.

7. The optical wire grounding assembly of claim 1 further comprising implementing a ground connection with said shield.

8. A method for grounding a fiber optic cable having a conductive shield comprising:
  positioning a first member having a first array of prongs against a fiber optic cable;
  positioning a second member having a second array of prongs against said fiber optic cable at a position generally opposite said first member while slidably receiving bosses of the first member in bores defined in bosses of the second member; and
  fastening together said first and second members so that prongs of said first and second arrays engage said shield.

9. The method of claim 8 further comprising threading fastener through openings of the ends of aligned bosses slidably receiving portions of said second member in portions of said first member.

10. The method of claim 8 wherein said fiber optic cable comprises a strength member and further comprising forcing a pair of prongs to cooperatively pinch said strength member.

* * * * *